April 26, 1960
J. R. URSCHEL ET AL
2,934,117
MACHINE FOR PERFORMING INTERSECTING CUTS
IN A PRODUCT TO SECTIONALIZE THE SAME
Filed Jan. 24, 1955
7 Sheets-Sheet 7
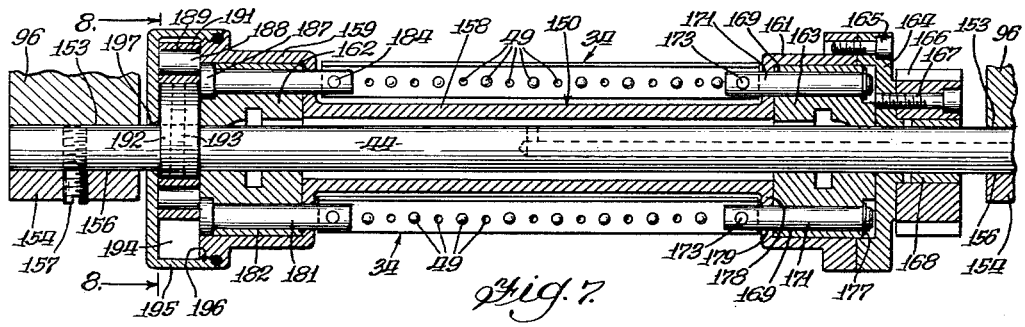
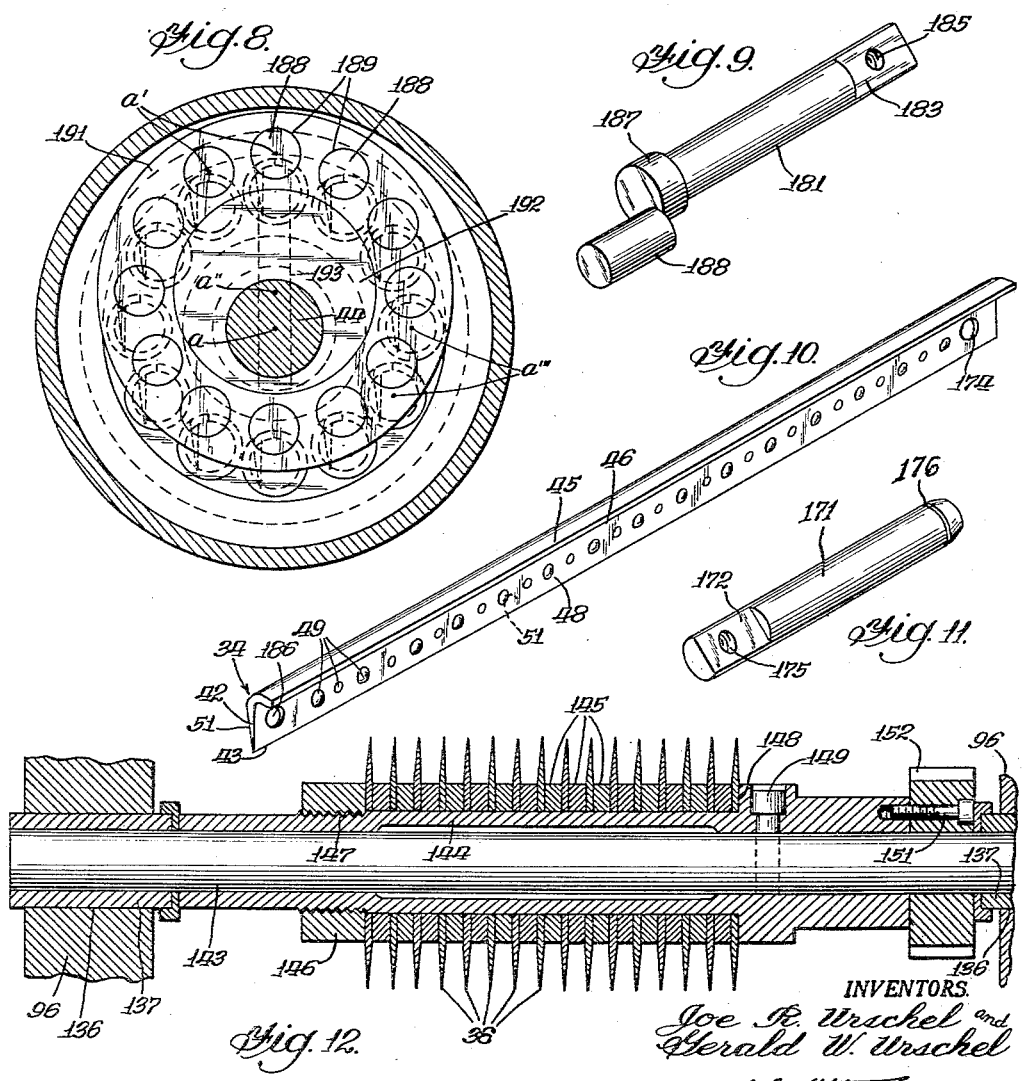
INVENTORS.
Joe R. Urschel and
Gerald W. Urschel
By
Att'y

United States Patent Office 2,934,117
Patented Apr. 26, 1960

2,934,117

MACHINE FOR PERFORMING INTERSECTING CUTS IN A PRODUCT TO SECTIONALIZE THE SAME

Joe R. Urschel and Gerald W. Urschel, Valparaiso, Ind.

Application January 24, 1955, Serial No. 483,616

13 Claims. (Cl. 146—78)

This invention relates to machines for cutting articles as potatoes into geometric pieces and more particularly concerns a machine adapted to cut successive slices from the articles, cut the slices into strips and transversely cut the strips to form a product comprised of cubicle particles.

The product which the present invention embodiment is capable of producing is used by commercial processors. The product is particularly adapted for use in canned soups containing various diced vegetables as potatoes, carrots, turnips, etc. One criterion indicating high grade and quality for canned goods containing cubed vegetables is for the cubes to be substantially geometrically perfect. Machines heretofore used for forming cubes from potatoes have handled them in such a manner that slices which have a tendency to develop miniature fissures principally in one direction thereacross have first been cut transversely of these fissures to form strips transversely traversed by sections of the fissures so that subsequently when the strips are cut transversely for forming the cubes, fragments of the cubes will break off at the fissures leaving an undesirably high percentage of fragments of the particles which are only portions of cubes with irregular corners, rough faces and non-geometric in shape.

An important object of the present invention is the provision of a machine which cuts the slices into strips extending parallel with the prevailing direction in which the fissures would tend to extend, and then cutting the strips transversely to form cubes therefrom without bending or bowing these strips and to thus avoid opening up the fissures in a manner that would cause fragmentation of the cubes.

A further object is the provision of a machine having a strip cutting knife assembly disposed in close proximity with the cutting edge of the slicing knife to commence the strip cutting operation upon each slice as it is being advanced past the slicing knife edge and before any portion of the slice attains a length capable of bowing enough for fissures of substantial significance to form therein.

A additional object is the provision of a strip cutting knife assembly comprising a plurality of knives in parallelism with and orbitally movable about an axis extending in parallelism with the slicing knife edge and transversely of the direction of a slice being formed across such edge, and the direction of orbital movement of the knives being such as to carry them successively penetratively into a slice being formed and while having a component of such movement in the direction of slice movement and at least equal thereto in speed whereby the orbitally moving knives successively cut strips from the slice as it is being formed and propel these strips in the direction of slice movement.

Another object is the provision of article slicing and strip cutting mechanism according to the preceding object wherein there is a guiding face upon which the strips cut from the slice are propelled while being maintained thereby in the form of straight unbowed strips and guided thereby into a bank of rotating disc knives spaced apart lengthwise of the strips for cutting them into cubes.

A further object is the provision of a novel strip cutting knife assembly operable to planetate the knives at high speed through an orbital path without rotating them about their individual principal axes.

Still another object is the provision of a novel strip cutting knife embodying means upon a face thereof to prevent adhesion of the strips thereto and thus facilitate discharge of the strips from the strip cutting knife assembly.

The above and other desirable objects inherent in and encompassed by the invention are elucidated in the ensuing specification, the appended claims and the annexed drawings, wherein:

Figure 2:
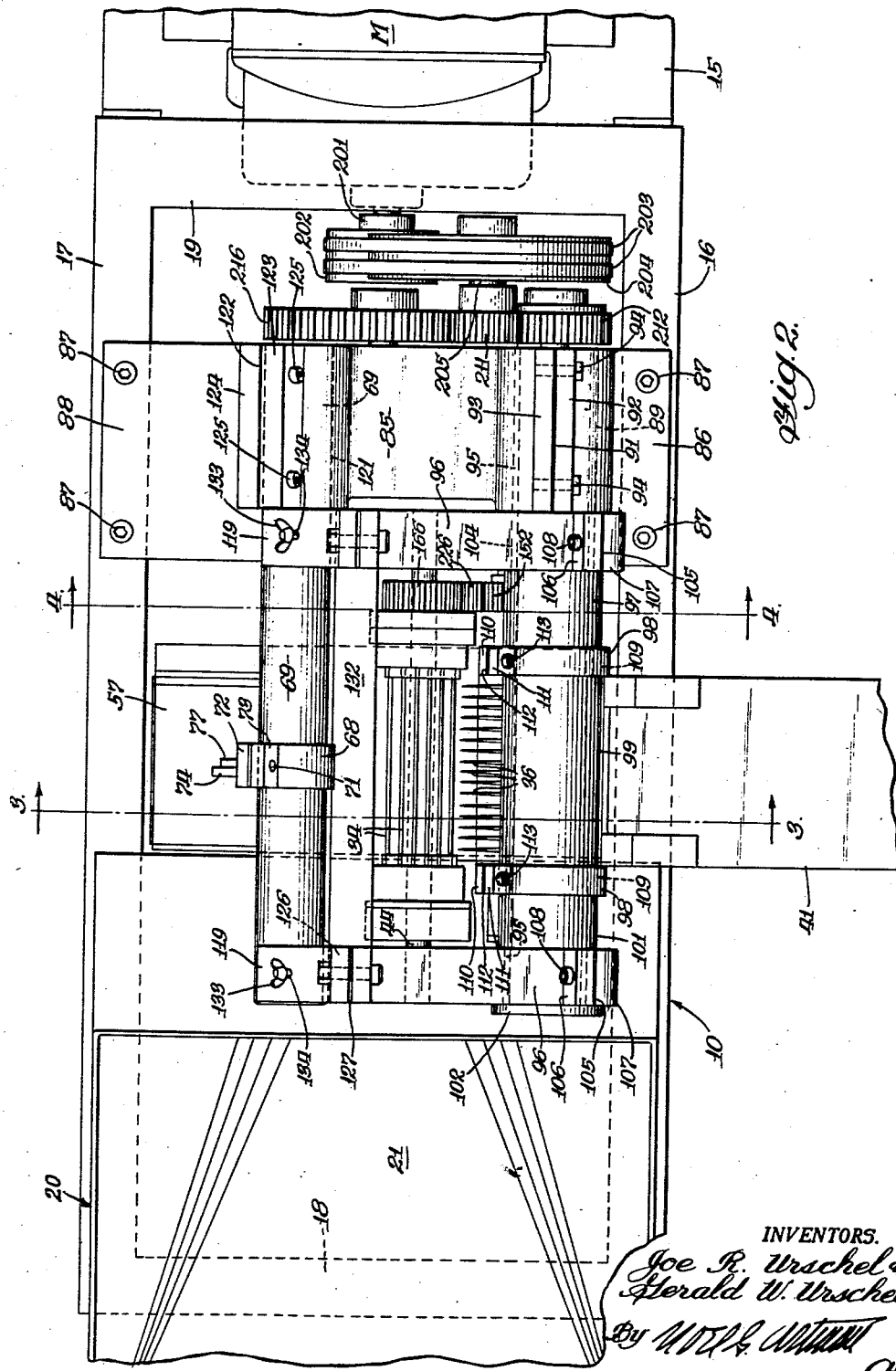
Fig. 2 is a plan view enlarged with respect to Fig. 1, of the machine with portions of an article feeding hopper, a driving motor and a product discharge hood thereof broken away.
Figure 3:
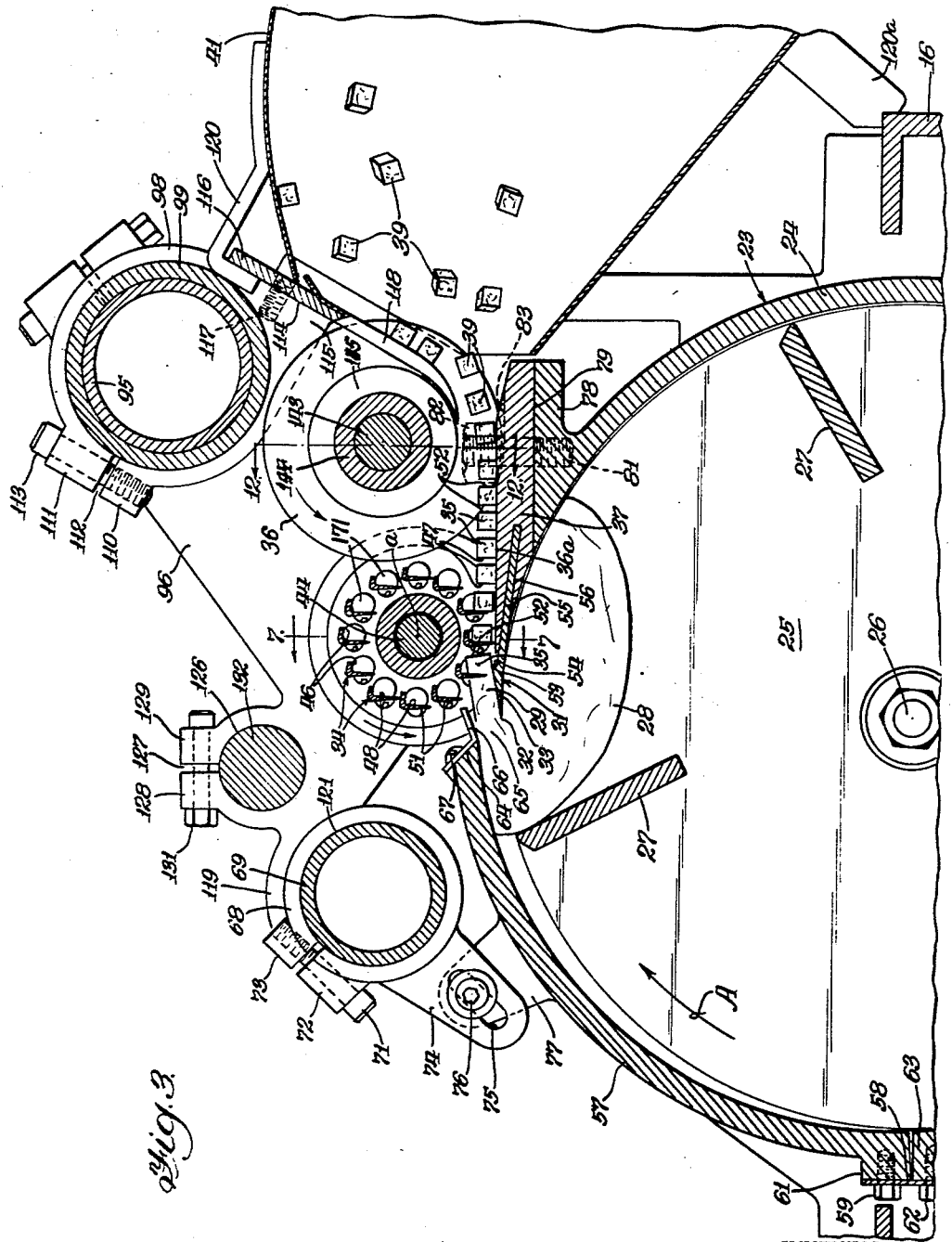

Fig. 3 is an enlarged fragmentary sectional view taken at the plane indicated by the line 3—3 in Fig. 2, transversely through the upper portion of a rotor chamber in which articles to be operated on by the machine are revolved for carrying them into cooperative relation with a slicing knife, the view also being taken transversely through such slicing knife, an assembly of orbital strip cutting knives and a bank of rotatable disc knives for cutting the strips into cubes.

Figure 4:
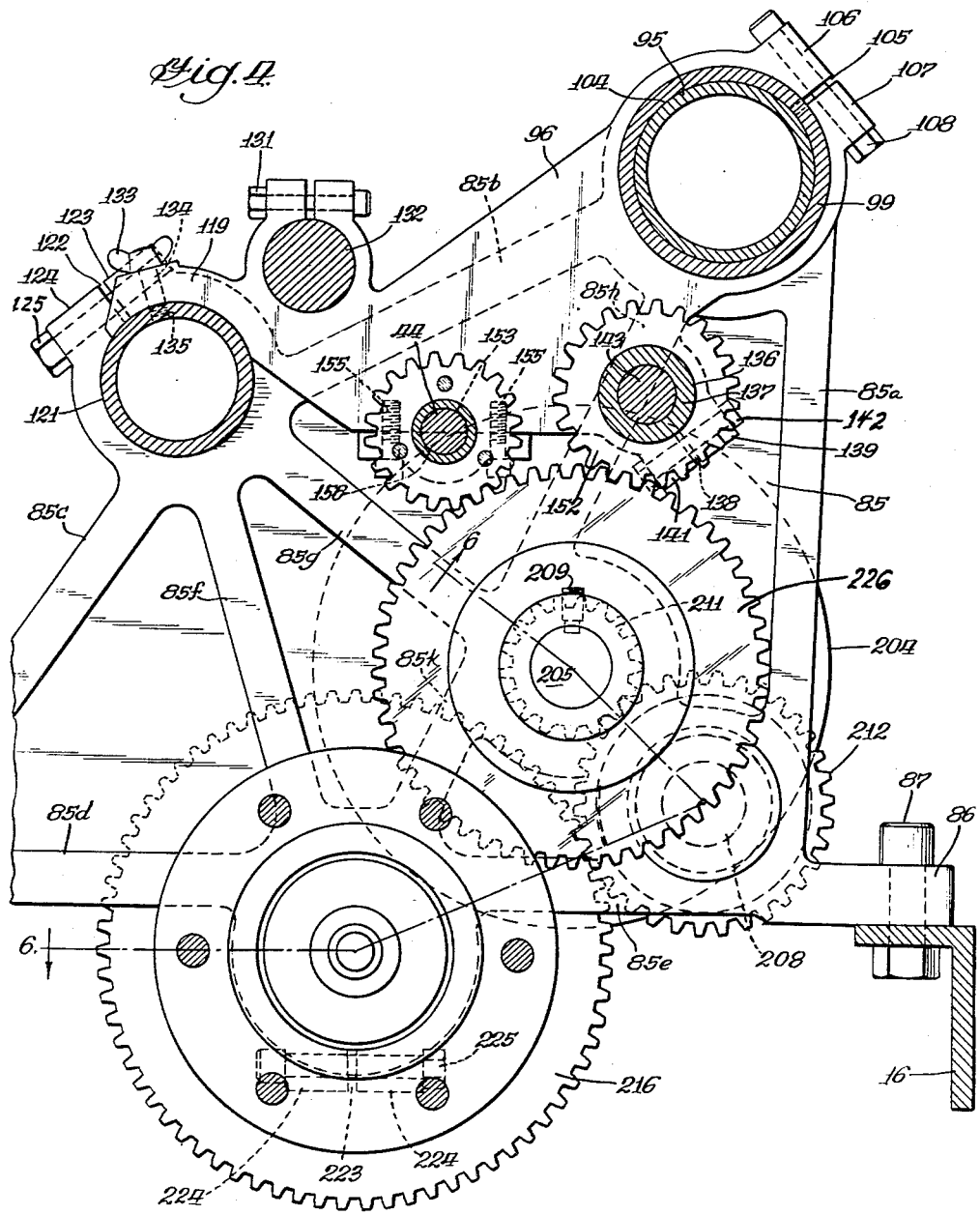

Fig. 4 is an enlarged fragmentary sectional view taken at the plane indicated by the line 4—4 in Fig. 2, illustrating a bearing-containing casting for supporting tubular frame members and power transmitting shafts together with drive gearing cooperable with these shafts for transmitting drive to rotating parts of the machine.

Figure 5:
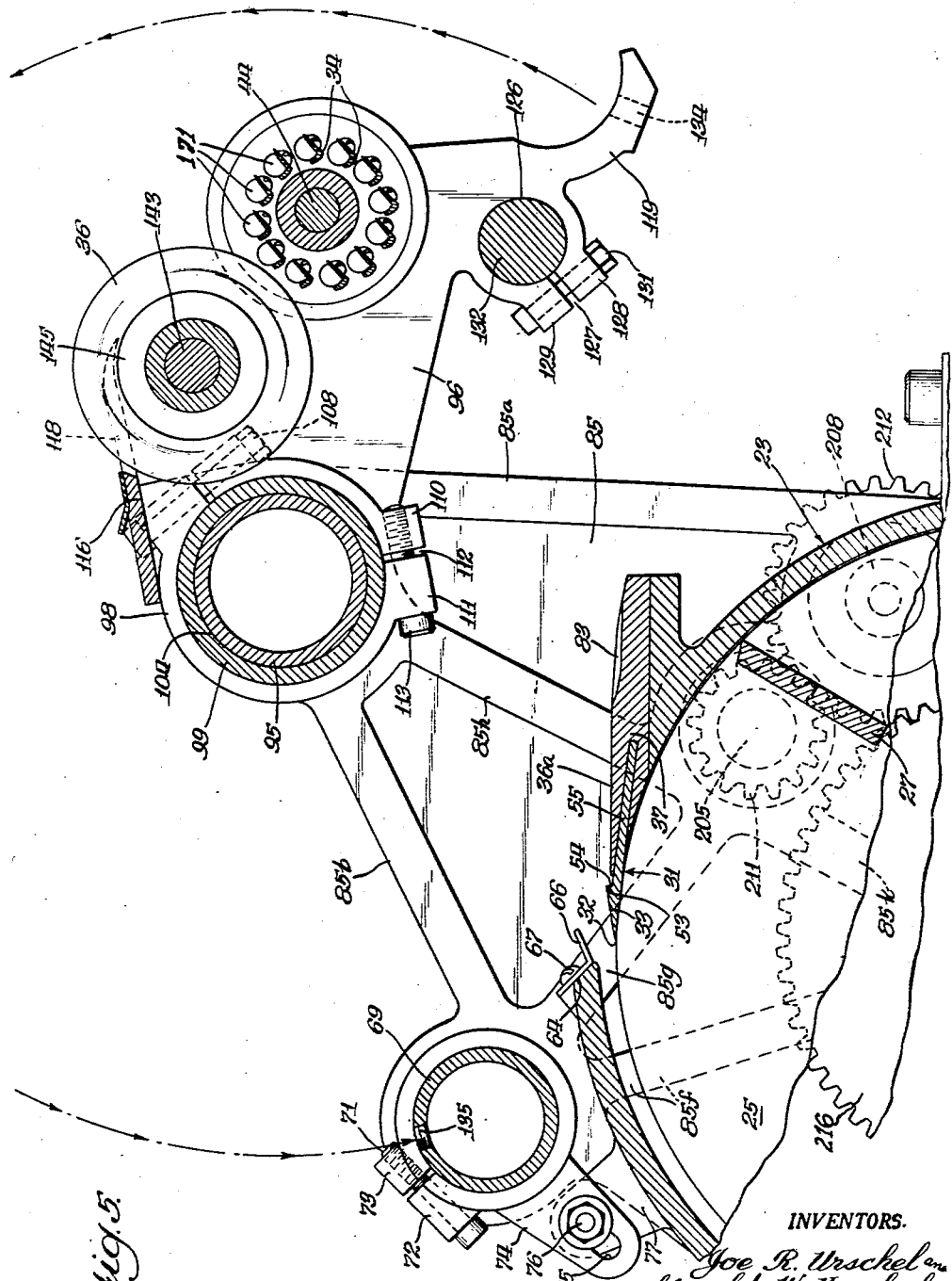

Fig. 5 is an enlarged view taken similarly to Fig. 4 with certain of the parts omitted and illustrating a swingable frame, which carries the strip cutting knife assembly and the dicing knife bank, swung out of an operating position to facilitate access to these and other parts of the machine for cleaning and servicing.

Figure 6:
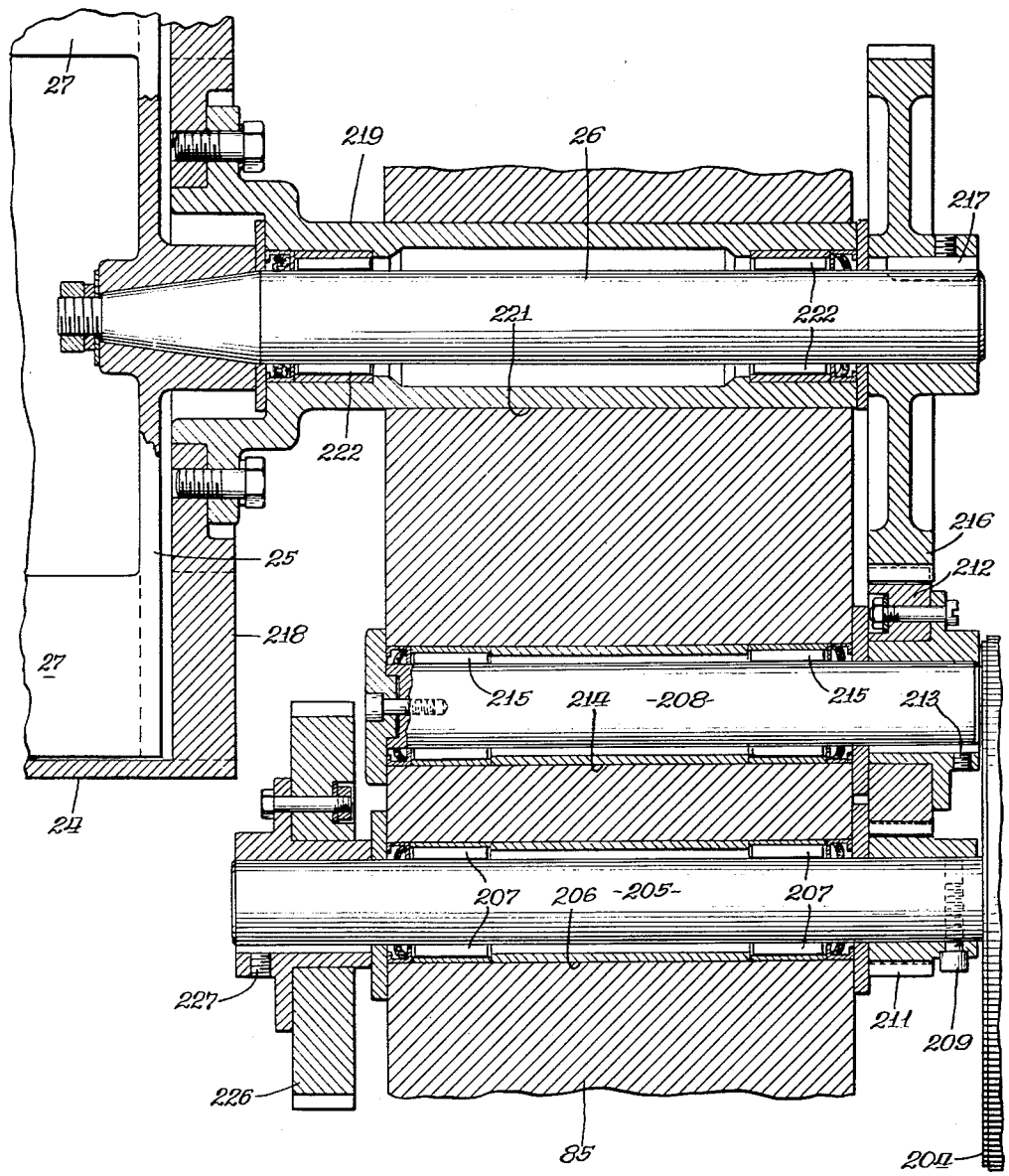

Fig. 6 is a panoramic fragmentary sectional view taken at the section planes indicated by the multi-directional line 6—6 in Fig. 4 and in the directions indicated by the arrows in association with such line.

Fig. 7 is a sectional view taken substantially at the plane indicated by the line 7—7 in Fig. 3, axially of and through the orbital strip cutting knife assembly.

Fig. 8 is an enlarged transverse sectional view through an end portion of the strip cutting knife assembly, taken at the plane indicated by the line 8—8 in Fig. 7.

Fig. 9 is an enlarged view of an anchorage and driving member for one end of one of the strip cutting knives.

Fig. 10 is an enlarged perspective view of one of the strip cutting knives.

Fig. 11 is an enlarged perspective view of an anchorage bearing member for attachment to the other end of a strip cutting knife.

Fig. 12 is an axial sectional view through the dicing knife bank substantially as indicated by the line 12—12 in Fig. 3.

Figure 1:
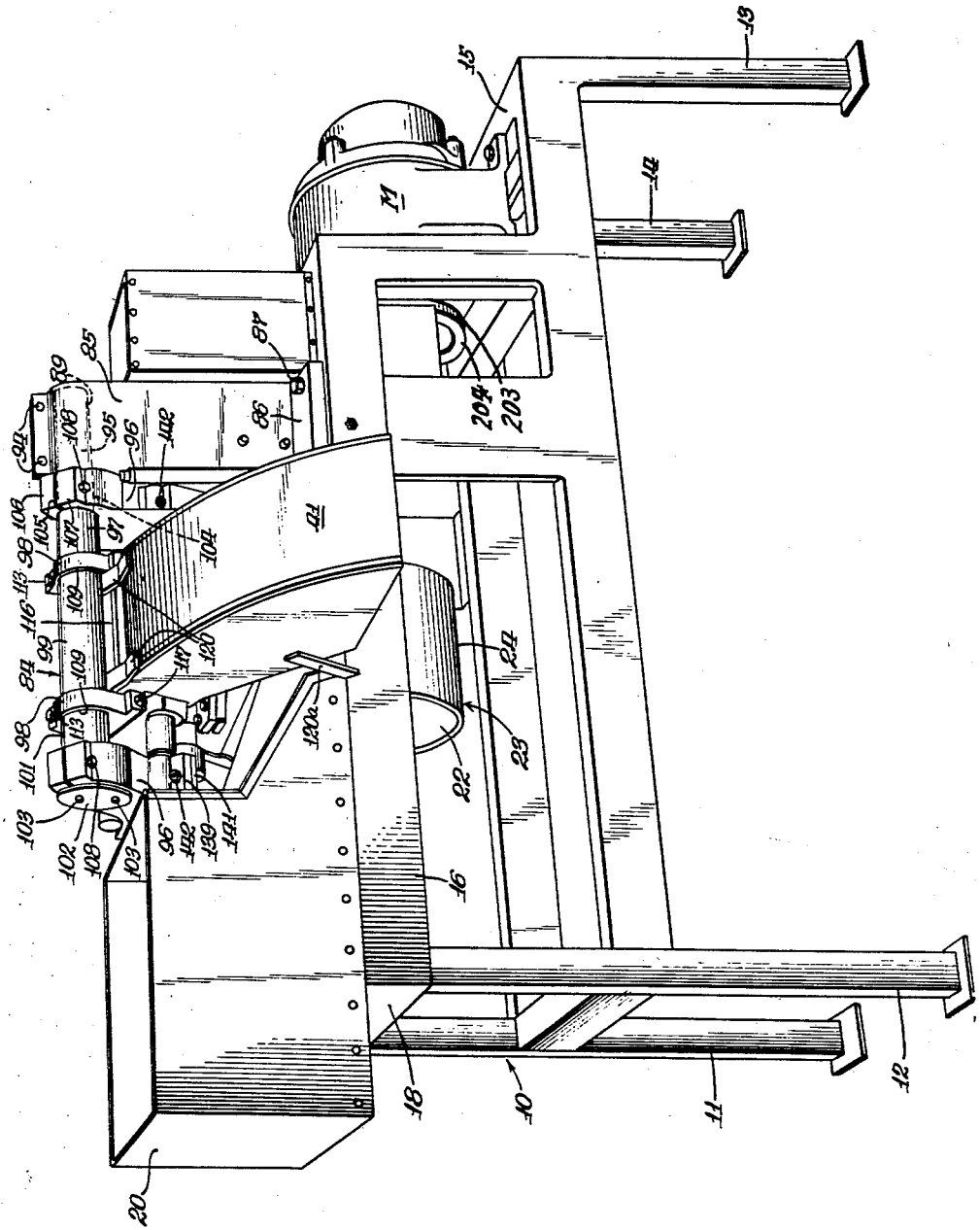
Fig. 1 is a perspective view of a machine embodying a preferred species of the invention.

A frame-like bench 10 of the machine, Figs. 1 and 2, is fabricated primarily from structural tubing of square and rectangular section welded together to provide two long upright legs 11 and 12 at one end and two shorter legs 13 and 14 at the opposite end. A step portion 15 of the bench above the shorter legs supports an electric motor M for driving the moving parts of the machine that are mounted upon a rectangular top portion of the bench including long side members 16 and 17 and end members 18 and 19.

A batch of sliceable articles to be diced by the machine are first placed within a hopper 20 having a bottom 21 which declines toward a circular end wall 22 of a rotor chamber 23 suspended between the bench top members 16 and 17. Chamber end wall 22 contains an opening (not shown) through which the articles are fed into the chamber from the sloping bottom wall of the hopper. A cylindrical wall 24 of the rotor chamber separates the end wall 22 from an opposed opposite circular end wall 218 shown fragmentarily in Fig. 6. A rotor 25 disposed in the chamber 23 is constrained for rotation with a rotor drive shaft 26, Fig. 6, coaxially with the cylindrical wall 24, as shown in Fig. 3. The rotor has a plurality of radially extending impellers 27 spaced circumferentially thereabout for propelling the sliceable articles 28, a portion of one being shown in Fig. 3, about the inner periphery of the wall 24 in the direction indicated by arrow A. Every time each article 28 traverses the upper portion of the cylindrical chamber wall 24 a slice 29 is cut therefrom by a slicing knife 31, and while each slice is being formed by a cutting edge 32 of the knife penetrating the sliceable article and being guided by a knife face 33 receding from such cutting edge, elongated strip-cutting knives 34 which are moved orbitally counter-clockwise as viewed in Fig. 3 successively penetrate these slices 29 and cut them into strips 35. These strips are propelled by the rapidly orbitally moving knives 34 at high speed so that as the strips are discharged from the set of knives 34 such strips slide across a transfer face 36a of a transfer plate 37 into a bank of disc-shaped dicing knives 36, Figs. 3 and 12, which are rotating counter-clockwise as viewed in Fig. 3 to cooperate with the plate 37 for cutting these strips into dice-shaped pieces 39 which are discharged through a hood 41, Figs. 1, 2 and 3, into any desired receptacle (not shown). When the bank of disc knives 36 is present in the machine the finished product is the dice-shaped particles 39, although if the bank of knives 36 is omitted from the machine the strips 35, suitable for French fry style of potato is discharged as a finished product through the hood 41.

Referring more in detail to the slender rectilinear knives 34, it can be seen in Figs. 3 and 10 that these knives comprise a thin vertical body 42 with a lower cutting edge 43 extending lengthwise thereof. Supporting and revolving mechanism for the strip cutting knives 34, later to be explained, always maintains the knife bodies 42 in respective vertical planes while revolving them about the longitudinal axis (a) of a fixed rod 44. Each knife 34 has a flange 45 projecting transversely from its upper edge to form an included angle with the knife body 42 of slightly less than 90°. This causes the flanges 45 to contact the upper sides of the cut strips 35 with only a tip portion 46 thereof to avoid the upper faces of the strips 35 having a broad area of contact with the undersides of the flanges 45 so the juice-coated upper surface of the cut strips will have less tendency to adhere to the knives. This makes the knives more conducive to discharging the cut strips 35 toward the bank of dicing knives 36. Adhesion between the trailing faces 47 of the strips 35 and the leading faces 48 of the knife bodies 42 is prevented by a plurality of protuberances 49, Fig. 10, upon these knife faces. The contacting edges 46 of the knife flanges 45 and the knife body protuberances 49 complement one another in making the knives readily discharge the strips 35.

The strip-cutting knives 34 are spaced apart circumferentially of an orbit of movement therefor coinciding with and thus defined by anchorage pins 171 therefor, Figs. 7, 3 and 11. The principal axis of such orbit coincides with an axis (a) of the rod 44; note Figs. 3, 7 and 8. This principal axis for the orbital movement of the knives 34 is parallel with such knives, and as seen in Fig. 3, is rearward of a trailing edge 53 of slicing knife slice-guiding face 33. However, the orbit axis (a) is in such proximity to the face trailing edge 53 that a portion of such orbit between the 9 o'clock and 6 o'clock positions as viewed in Fig. 3 leads counterclockwise toward said face 33 and curves rearward therefrom through a zone of contiguity with the trailing edge 53. The nadir of this orbital path exists at the 6 o'clock position and can be seen to be rearward of the slice-guiding face rearward edge 53 and on the opposite side of the extended plane of the slice-guiding face 33 with respect to the principal axis (a) of the orbital path.

While the strip cutting knives 34 descend from the 9 o'clock position toward the 6 o'clock position, Fig. 3, they possess both a horizontal component and a vertical component of speed. During this portion of the revolving motion of the knives the vertical speed component decelerates from maximum to zero speed whereas the horizontal speed component accelerates from zero to maximum. As the knife cutting edges 43 reach the upper surface of a strip 29 being formed, the horizontal component of knife speed is virtually equal to the horizontal speed of the slice 29 so the penetration of the knife through the slice will be at substantially right angles thereto. There is, however, a slight further horizontal speed acceleration of the knives during penetration of the slice so that the trailing face or back 51 of each knife will be clear of the leading face 52 of the succeeding strip 35 only partially cut by the next succeeding knife. As the knives descend into the slice 29 their cutting edges 43 traverse the path of travel of such slice while approaching the slice guiding face 33 of the knife. This guiding face has the above-mentioned rearward trailing or departure edge 53 coincident with a shoulder 54 on the upper side of the knife. A plate-like body portion 55 of the knife 31 fits into a slot 56 of the strip transfer member 37 and the transfer surface 36a of the member 37 is at slightly lower elevation than the trailing edge 53 of the knife guiding surface 33 wherefore the descending strip cutting knives 34 can cooperate with such guiding surface while cutting the strips 35 from the slice 29 and clear the trailing edge 53 while in close proximity thereto at the instant the strips are completely severed from the slice.

A section 57 of the cylindrical rotor chamber wall 24 is pivotally assembled with the remainder of such wall by being connected therewith, Fig. 3, with a flexible hinge plate 58 of which an upper end portion is connected by a cap screw 59 with a boss 61 on the lower end of the wall section 57 and of which plate the lower end is connected by a cap screw 62 with a boss portion 63 of the wall 24. The upper edge 64 of the hinged wall section 57 is swung radially outwardly from the slicing knife edge 32 to form a slot-like opening 65 extending axially of the cylindrical wall 24 and through which the slice 29 can pass onto the slice guiding surface 33. A visor plate 66 is attached to the edge 64 of the adjustable wall section by one or more screws 67 to prevent accidental rising of the leading edge of a strip 29 into a position for premature engagement by the orbitally moving strip cutting knives. The width of the discharge slot 65 radially of the chamber wall 24 and the corresponding thickness of the strip 29 passing therethrough can be selectively determined by changing the rotative position of a split collar 68, Figs. 2 and 3, upon a fixed frame tube 69 after loosening a screw 71 in apertured ears 72 and 73 of the collar for loosening it upon the tube. A lug 74 upon the collar 68 has a slot 75 containing a section of a pin 76 anchored in a stud 77 projecting radially from the wall section 57. After the collar 68 has been rotated to be operable through the connecting pin 76 for selectively adjusting the width of the slide discharging slot 65 the screw 71 will be tightened to maintain the adjustment.

In approximately the 1 o'clock position upon the cylindrical rotor chamber wall 24 in Fig. 3 there is formed an exterior flange 78 with a horizontal upper surface 79 for mounting the transfer plate 37 which is held in place therein by a plurality of screws 81 each having a lock nut 82 thereon. The upper face of the transfer plate 37 contains a transverse row of grooves 83 to respectively receive the lowermost circular cutting edge portions of the disc knives 36, Figs. 3 and 5. These grooves improve the bite formed between the disc knives and the transfer surface 36a of the strip transfer plate 37 for receiving and cutting the strips 35 into cubes.

A cantilever frame structure 84, Fig. 1, for supporting the strip-cutting knives 34, the disc knives 36, Fig. 3, together with rotatable driving parts for the knives is supported by and projects leftward from a sturdy upright bearing casting 85, Figs. 1 and 2. This casting 85 has a footing flange 86 mounted upon the top side member 16 of the bench 10 and secured thereto by cap screws 87. A footing flange 88 at the opposite side of the casting 85 is mounted upon the top side member 17 of the bench 10 and secured thereto by additional cap screws 87. In Figs. 4 and 5 this bearing casting 85 can be seen to have a plurality of reinforcing ribs 85a, 85b, 85c, 85d and 85e extending about its border and projecting leftward therefrom as this casting is viewed in Figs. 1 and 2. Additional reinforcing ribs 85f, 85g, 85h and 85k project outwardly from the same side of the bearing casting 85.

In Figs. 1 and 2 the uppermost portion of the bearing casting 85 can be seen to contain a split transverse cylindrical bore 89 of which the parting split 91 extending axially thereof opens upwardly between a pair of opposed flanges 92 and 93 wherein there are bolts 94 for drawing these flanges together and causing the sides of the cylindrical bore to grip tightly onto a tubular cantilever frame member 95 shown in transverse section in Figs. 3, 4 and 5 and shown dotted in Figs. 1 and 2. This tubular frame member 95 projects leftward from the bearing casting 85, Figs. 1 and 2, for successively supporting thereon a pivotable bearing plate 96, a spacer sleeve 97, a bracket 98, a second spacer sleeve 99, a second bracket 98, a third spacer sleeve 101 and a second pivotable bearing plate 96. A circular disc 102 detachably secured to a plug (not shown) within the outer end of the cantilever tube 95 by screws 103, Fig. 1, maintains the parts 96 through 101 upon the tube. In each of Figs. 1, 2, 4 and 5, the upper end of the bearing plate 96 adjacent the bearing casting 85 can be seen to embody a circular axially split bore 104 through which the frame tube 95 extends. The split 105 of the bore 104 is between flanges 106 and 107 through which a bolt 108 extends for drawing these flanges together and clamping the inner periphery of the bore 104 firmly onto the tube 95. The bearing plate 96 on the projected end portion of the cantilever tube 95 has a similar split bore with associated flanges 106 and 107 and a clamping bolt 108. Axially split holes 109 within the brackets 98 receive respective sections of the cantilever tube 95 and apertured flanges 110 and 111 on opposite sides of the axial split 112 in these brackets are drawn together by bolts 113 for clamping these brackets firmly onto the tube. Flat faces 114 respectively upon bosses 115 of these brackets 98 are for mounting flatly thereagainst one side of a dice stripper plate 116, Figs. 1 and 3, secured in place thereon by screws 117 and extending through the plate 116 respectively into threaded relation with the bosses 115. This stripper plate 116 has a plurality of laterally spaced stripping fingers 118 which extend into meshed relation with the disc dicing knives 36 for stripping the cubed product 39 therefrom as illustrated in Fig. 3. The product discharge hood is removably attached to the plate 116 by hooks 120 while propped against the bench top member 16 by short legs 120a, Figs. 1 and 3.

Arcuate end portions 119 of the bearing plates 96, Figs. 2, 3 and 4, rest upon the upper side of the second cantilever tube 69 anchored in and projecting endwise from a split bore 121 in the bearing casting 85. The split 122, Figs. 2 and 4, of the split bore 121 is between flanges 123 and 124 which are drawn together by bolts 125 to clamp the inner periphery of such bore firmly onto the portion of the tube 69 contained therein. The cantilever tube 69 extends in laterally spaced parallelism with the cantilever tube 95.

Split bores 126 in upper portions of the bearing plates 96 adjacent the arcuate end portions 119 contain respective split 127 between upwardly projecting flanges 128 and 129 through which bolts 131 extend and are tightenable for gripping the cylindrical peripheries of such bores tightly onto end portions of a tie rod 132 for interconnecting and bracing the bearing plates 96. The rod 132 together with the bearing plates 96 constitute a frame wherein the assembly of orbital knives 34 and the assembly of disc dicing knives 36 are mounted. When thumb screws 133, Figs. 2 and 4, which extends through holes 134 of the arcuate bearing plate portions 119 into respective threaded holes 135 therefor in the cantilever tube 69 are removed, the frame consisting of the bearing plates 96 and the tie rod 132 can be swung upwardly about the axis of the cantilever tube 95 into the position shown in Fig. 5 to carry the disc knives 36 and the assembly of orbital knives 34 therewith to expose these knives and the slicing knife 31 to facilitate cleaning and servicing thereof.

Each of the bearing plates 96 in a lower portion thereof contains a split bore 136 grippingly mounting a bearing sleeve 137 therein; see Figs. 4 and 12. The split 138 in each of these bores 136 is between apertured flanged 139 and 141 which receive a tightening bolt 142 for gripping the inner periphery of the bore onto the bearing sleeve 137 therein; also see Fig. 1. A dicing knife shaft 143 journaled within the bearings 137 carries a mounting sleeve 144 for the disc knives 36 and spaced rings 145 therebetween. A nut 146 turned onto a threaded portion 147 of the sleeve 144 clamps the assembly of knives 36 and spacers 145 against a shoulder 148 of the sleeve. A screw 149 secures the sleeve 144 and the shaft 143 in rigid assembly, and one or more screws 151 secures a driving pinion 152 rigidly to an end of the sleeve 144.

The assembly of strip cutting knives 34 shown in Figs. 3 and 7 through 11 is assembled about the non-rotatable rod 44 having end portions extending between and respectively carried in semi-cylindrical notches 153 in the lower sides of the bearing plates 96. Pillow blocks 154 respectively secured to the lower edges of the bearing plates 196 by cap screws 155, Fig. 4, contain semi-circular notches 156 complemental with the semi-circular notches 153 for encircling and gripping onto the end portions of the rod 44. A set screw 157 in one of the pillow blocks 154, Fig. 7, extends into a transverse bore in rod 44 to positively constrain it from rotating.

A knife carrier 150 disposed rotatively upon the rod 44 comprises a tubular member 158 coaxial with the shaft 44 having enlarged diameter cylindrical end portions 159 and 161 which contain annular bearing blocks 162 and 163. Bearing block 163 is held within the enlargement 161 by a disc-like cap 164 secured to such enlargement by a circle of cap screwss 165 of which one is shown in Fig. 7. A gear pinion 166 is secured to the cap 164 by a plurality of cap screws 167 of which one is shown in Fig. 7. This pinion is journaled upon the rod 44 by a bushing 168.

Bearing block 163 contains a circle of axial bearings 169 extending axially therethrough and spaced equidistantly circumferentially thereabout These bearings 169 are equal in number to the number of knives 34, and each bearing contains a cylindrical knife anchorage element 171, Figs. 7 and 11. A flat face 172 on each anchorage element is adapted to engage flatly against an end portion of knife 34 associated therewith and connected thereto by a pin 173 which extends through holes 174 and 175 therefore respectively in the knife and the pin 171; see Figs. 7, 10 and 11. The right ends of the anchorage pins 171 contain respective circuferential grooves 176 in which are inserted snap rings 177 to react against the right end of the bearing block 163 to prevent the pins 171 being pulled endwise from the bearings 169. It can also be seen in Fig. 7 that a radial wall portion 178 of the carrier tubular member 158 contains openings 179 respectively registering with the bearings 169 to facilitate projection of the anchorage pins 171 axially outwardly through such radial wall portion.

The left ends of the knives 34, Fig. 7, are respectively held by anchorage elements or pins 181, also shown in Fig. 9, respectively disposed in bearings 182 in the bearing block 162 and respectively coaxial with the bearings 169 in the bearing block 163. A flattened side portion 183 of the anchorage pins 181 flatly engage the knives associated therewith and secured thereto by pins 184 extending through transverse holes 185 in such anchorage pins and holes 186 in the left ends of the knives, Figs. 9 and 10. Each anchorage pin 181 comprises a head 187 on its left end for reacting against the left end of the bearing block 162, Fig. 7. In Figs. 7 and 9 it can be ascertained that each anchorage pin 181 includes a crank bearing member 188 of which the principal axis is eccentric with the principal axis of the main body portion of the pin 181 and in parallelism therewith. These crank bearings 188 which are formed integrally with the pin heads 187 are disposed respectively in bearings 189 within and spaced equidistantly circumferentially about an orientation ring 191 which is journaled upon a circular bearing member 192 mounted non-rotatively and eccentrically upon the fixed rod 44. A pin 193 extends diametrically through the eccentric bearing 192 and the rod 44 to maintain the direction of eccentricity of the bearing member in a vertical plane in coincident parallelism with the axis of the rod 44 and disposed upwardly with respect to such axis. In Fig. 8 it can be ascertained that the axes ($a'$) of the circle of bearings 189 are parallel with the axis ($a''$) of the eccentric bearing 192 and are spaced radially therefrom equidistantly with the spacing of the carrier bearing axes ($a'''$) from the axis ($a$) of the rod 44 and consequently of the knife carrier 150 which includes the tubular member 158. A lubricant-containing chamber 194 is formed within a cap 195, Fig. 7, which contains the orientation ring 191 and turns onto a threaded portion 196 of the carrier sleeve enlargement 159. A hole 197 in the cap 195 receives the rod 44 and forms a sliding sealing fit thereagainst.

When the gear pinion 166 is rotated about the axis of the rod 44, this rotation is imparted to the knife carrier tube 158 through the screws 167, the cap 164 and screws 165. The knife anchorage pins 171 and 181 cause the bearing blocks 169 and 162 which constitute elements of the knife carrier structure 150 to rotate with the tubular member 158. Thus, as the gear pinion 166 is rotated the knives 34 are revolved by the carrier 150 therefor about the axis of the rod 44. During such revolving motion of the knives 34 and the anchorage pins 181 therefor with the carrier bearing block 162, the crank bearings 188 mounted on the anchorage pins 181 cooperate with such pins for constraining the orientation ring 191 to rotate synchronously with the knife carrier. As the orientation ring 191 is thus rotated about the circular eccentric 192 such ring cooperates with this eccentric and the crank bearings 188 to constrain the knife anchorage pins or elements 181 against rotation about their individual axes. In this manner the knife anchorage elements 181 are caused to rotate in the bearings 182, during rotation of the knife carrier 150, to maintain the thin bodies 42 of these knives vertical while they are being revolved. With the bearing 192 disposed eccentrically upwardly with respect to the carrier axis ($a$) as illustrated in Fig. 8, the orientation ring 191 and the crank bearings 188 are operable pursuant to counter-clockwise rotation of the knife carrier, Figs. 3 and 8, to cause the knife bodies 42 to descend, while maintained in an upright position, successively into spaced sections of a slice 29 being formed from a sliceable article 28, for cutting the slice into strips in the manner explained hereinabove.

Power for driving the strip cutting knife assembly driving pinion 166 and the bank of disc dicing knives 36, Figs. 2, 3, 7 and 12, is received from the electric motor M, Figs. 1 and 2. An armature shaft 201 of such motor, Fig. 2, has a double groove pulley 202 constrained for rotation therewith for driving a pair of belts 203 which are trained thereabout and also trained about a large diameter double groove pulley 204, Figs. 1, 2, 4 and 6, for driving the latter. Pulley 204 is keyed to a shaft 205 which extends completely through a bore 206 in the bearing casting 85, Fig. 6, wherein such shaft is journaled upon sets of anti-friction bearings 207. Attention is invited to the multi-directional section line 6—6 in Fig. 4 along which the developed sectional view of Fig. 6 is taken, which will make it apparent why the shaft 205 in Fig. 6 is not disposed between shafts 208 and 26 although actually as viewed in Fig. 4, the shaft 205 is somewhat between the shafts 208 and 26. A set screw 209, Figs. 4 and 6, secures a pinion 211 non-rotatively to the shaft 205 adjacent the pulley 204. Pinion 211 meshes with a gear 212 which is secured by a set screw 213 upon the shaft 208 which is journaled within a bore 214 of the bearing casting 85 upon anti-friction bearings 215. The gear 212 in turn meshes with a larger gear 216 keyed at 217 to the shaft 26 which drives the impeller 25 in the rotor chamber 24 for the articles to be cut into the product. One end wall 218 of the rotor chamber has a tubular supporting stem 219, Fig. 6, mounted in a bore 221 of the bearing casting 85 and containing sets of anti-friction bearings 222 which rotatively support the rotor drive shaft 26. Bearing casting 85 contains a split 223, Fig. 4, parallel with and communicating with the lower side of the bore 221, Fig. 6, and flanges 224 at opposite sides of this split receive a bolt 225 tightenable to contract the inner periphery of the bore 221 firmly onto the rotor chamber supporting stem 219.

Returning to the pulley driven shaft 205, Figs. 4 and 6, this shaft has a gear 226 secured to the left end thereof by a set screw 227. Gear 226, Figs. 2 and 4, can be seen to mesh with the gear pinions 152 and 166 for driving the disc knives 36 and the assembly of strip cutting knives 34; also see Figs. 7 and 12.

Inasmuch as the operation and cooperation of these knives 34 and 36 with one another and with the article impeller 25 and the slicing knife 31 has been explained hereinabove, such explanation is not here repeated.

Having described this single embodiment of the invention with the view of clearly and concisely illustrating the same, we claim:

1. In a machine for performing intersecting cuts in product articles to sectionalize the same and wherein there is a linear path through which slices of such articles are movable; a slicing knife having a slice guiding face adapted for sliding engagement by broad faces of slices of such articles moved successively thereacross through said linear path which is in contiguous parallelism with such face, said knife having a slice cutting approach edge bordering said slice guiding face transversely of said path and also having a departure edge spaced lengthwise of said path from the cutting edge and bordering said slice guiding face transversely of said path, said slicing edge being adapted to penetrate an article approaching the same and moved across such edge to remove a slice from the article while the slice being thus formed is advanced along the path and across said face toward said departure edge; means cooperable with the knife and movable relatively thereto for moving the article toward and past the cutting edge to form the slice; a set of linear strip cutting knives extending transversely of said path in parallelism with said face and spaced apart circumferentially within an orbit of movement therefor of which a principal axis is parallel with said knives and on the opposite side of said path with respect to said departure edge but in such proximity to such face that a portion of the orbit leads about said axis toward said face and rearward into said path and then rearward from such departure edge, said strip cutting knives comprising substantially flat bodies disposed in respective parallel planes parallel with said axis and perpendicular to said path and each of said knife bodies having a cutting edge directed toward said path; and means operable in timed relation with the article moving means for imparting orbital movement to said knives while maintaining them in said parallel planes and in a direction that they successively traverse said orbit portion to move edgewise toward the slice guiding face into said path to penetrate a slice being formed at respective positions spaced lengthwise of said path to cut the slice into strips extending transversely of the path, said orbital movement imparting means concurrently imparting to the face-approaching knives a component of the orbital movement linearly of the path toward the departure edge of said face at a speed substantially equal to that of slice movement along the path, and the edges of said strip cutting knives being operated by said orbital movement imparting means to successively pass completely transversely through said linear path at an advanced position thereof contiguously beyond said departure edge whereby the strips are severed from the slice substantially coincident with the strips clearing said departure edge.

2. The combination set forth in claim 1 wherein the bodies of the strip cutting knives have strip engaging faces facing in the direction of slice movement along said path for contacting with the strips as they are cut from the slices, and said knives having respective flanges upon the edges of their bodies opposite from the cutting edges thereof, and said flanges projecting from the knife bodies in the direction faced by the strip engaging faces a distance to serve as stops for limiting movement of the strips as they are cut from the slice along said faces away from the cutting edges.

3. The combination set forth in claim 1 wherein the strip cutting knife bodies have respective faces facing in the direction of slice movement along said path for engaging the strips cut from the slices, said knives comprising flanges upon the edges of said bodies opposite from the cutting edges thereof, and said flanges forming an included angle of less than 90° with respect to said faces.

4. The combination set forth in claim 1 wherein the bodies of the strip cutting knives have respective faces facing in the direction of slice movement along said path for engagement with the strip cut thereby from the slice, and means upon the edges of said knife bodies opposite from the cutting edges thereof for abutment with the slices to limit movement of the strips along said faces away from said cutting edges.

5. The combination set forth in claim 1 wherein the slice cutting knives have respective faces facing in the direction of slice movement along said path for engagement with the strips cut from said slices, and each of said faces containing a plurality of miniature protuberance portions to limit the area of contact of such faces with the strips.

6. In a machine for dicing sliceable product articles and wherein there is a substantially straight course through which slices of such articles are movable; a slicing knife having a slice guiding face substantially conforming to a plane for sliding engagement by broad faces of slices of such articles moved successively thereacross through said course which is contiguous to and in parallelism with said face, said knife having a slice cutting approach edge bordering said face transversely of said course and also having a departure edge advanced rearward and lengthwise of said course from the cutting edge and bordering said slice guiding face transversely of said course, said slicing edge being adapted to penetrate an article approaching the same and moved across such edge to remove a slice from the article while the slice being thus formed is advanced along said course and across said face toward said departure edge; means cooperable with said knife and movable relatively thereto for moving the article toward and past the cutting edge to form said slice; a set of linear strip cutting knives extending transversely of said course in parallelism with said face and spaced apart circumferentially within an orbit of movement therefor of which a principal axis is parallel with said knives and on the opposite side of said course with respect to such departure edge and rearward thereof but in such proximity to such face that a portion of the orbit leads about said axis toward said face and rearward into said course, then rearward and downward contiguously past said departure edge and then rearward and upward into an advanced portion of said course; means operable in timed relation with the article moving means for imparting orbital movement to said knives in a direction that they traverse said orbit portion to move successively toward the slice guiding face into said course to penetrate a slice being formed at respective positions spaced lengthwise of said course to cut the slice into strips extending transversely of the course, said orbital movement imparting means concurrently imparting to the face-approaching knives a component of the orbital movement lengthwise of said course toward the departure edge of the strip guiding face at a speed substantially equal to that of slice movement along such course, the orbital movement of the face-approaching knives causing them to successively completely penetrate through the slice at an advanced position along said course contiguously beyond said departure edge to sever the strips from the slice substantially coincident with the strips clearing such edge; means providing a strip transfer face substantially in parallelism with said guiding face and defining one side of said advanced portion of said course constituting a continuation of that portion thereof along the guiding face of the slicing knife, said strip transfer face being adapted for sliding engagement by said strips propelled sidewise along the course by the orbitally moving strip cutting knives; and a bank of disc dicing knives rotatable about an axis parallel with the orbital axis of the strip cutting knives, the disc knives being spaced lengthwise of their axis and having circular cutting edges of which respective segments are in opposed contiguous relation with the transfer face to form a strip-cutting bite therewith for receiving the transferred strips, and said disc knives being rotatable about their axis to cooperate with the transfer face for cutting the transferred strips into cubes.

7. The combination set forth in claim 6 wherein there is a receding shoulder in the slicing knife coincident with the departure edge thereof, and wherein the strip transfer face is receded transversely of said path from said departure edge in the same direction as the shoulder.

8. In a machine for performing intersecting cuts in sliceable product articles to form elongated strip-like fragments thereof and wherein there is a substantially straight course through which slices of such articles are movable; a knife structure having a substantially flat slice guiding face for sliding engagement by broad faces of slices of such article moved successively thereacross through a portion of said course which is in contiguous parallelism with said face, said knife structure having a slice cutting approach edge bordering said face transversely of said course and a strip transfer face substantially parallel with the slice guiding face but spaced contiguously with such guiding face in a more advanced position than the slice-guiding face in a rearward direction lengthwise of the course and receded transversely of the course with respect to the slice guiding face, the knife structure also having a receding shoulder extending transversely of the course between said faces, said slice cutting approach edge being adapted to penetrate an article approaching such cutting edge and moved thereacross to remove a slice from the article while the slice being thus formed is advanced along said course and across the slice guiding face toward said shoulder; means cooperable with the knife and movable relatively thereto for moving the article toward and past the cutting edge to form said slice; a set of linear strip cutting knives extending transversely of said course in parallelism with the slice guiding face and spaced apart circumferentially within an orbit of movement therefor of which a principal axis is parallel with said knives and on the opposite side of said course with respect to said shoulder and rearward thereof but in such proximity to such face that a portion of the orbit leads about said axis toward the slice guiding face and rearward into said course forwardly of the shoulder, then rearward and downward first toward and then contiguously past said shoulder, and then rearward and upward through an advanced portion of the course rearward of the shoulder; means operable in timed relation with the article moving means for imparting orbital movement to said knives in a direction successively moving them through said orbit portion toward the slice guiding face into said course to penetrate a slice being formed at respective positions spaced lengthwise of said course to cut the slice into strips extending transversely of the course, said orbital movement imparting means concurrently imparting to the face-approaching knives a component of the orbital movement lengthwise of said course toward said shoulder at a speed substantially equal to that of slice movement along such course, the orbital movement of the face approaching knives causing them to successively completely penetrate through the slice at an advanced position along said course contiguously beyond said shoulder to complete severance of the strips from the slice; and the orbitally moving strip cutting knives being adapted to eject and propel the severed slices sidewise along said course in sliding engagement with said strip transfer face.

9. In a machine for performing intersecting cuts in sliceable product articles to form elongated strip-like fragments thereof and wherein there is a course through which slices of such articles are movable; a knife structure having a substantially flat slice guiding face for sliding engagement by broad faces of slices of such articles moved successively thereacross through a substantially straight portion of said course, said knife structure having a slice cutting approach edge bordering said face transversely of said course portion and a strip transfer face substantially parallel with the slice guiding face but spaced contiguously with such guiding face in a more advanced position in a rearward direction lengthwise of the course and receded transversely of the course with respect to the slice guiding face, the knife structure also having a receding shoulder extending transversely of the course between said faces, said slice cutting approach edge being adapted to penetrate an article approaching such cutting edge and moved thereacross to remove a slice from the article while the slice being thus formed is advanced along said course and across the slice guiding face toward said shoulder; means cooperable with the knife structure and movable relatively thereto for moving the article toward and past the cutting edge to form said slice; and knife means comprising a plurality of knives movable orbitally about an axis parallel therewith and with said shoulder and rearward of said shoulder on the opposite side of the course therefrom, a portion of the orbit being disposed in opposed relation to the slice guiding face and shoulder and the knives traversing this orbit portion moving successively toward the slice guiding face and concurrently in the direction of slice movement lengthwise of said course to penetrate the moving slice at respective positions thereon spaced apart lengthwise of the course, said orbitally moved knives being adapted to penetrate completely through the slice substantially at said shoulder to sever strips from the slice and to propel the strips lengthwise of the course upon said strip transfer face, and means in driving relation with the knives for orbitally moving such knives.

10. In a machine for performing intersecting cuts in product articles to sectionalize the same, a slicing knife having a forward cutting edge adapted to penetrate such an article moved rearwardly transversely of and toward said edge to remove a slice from such article, the slicing knife also having a rearward trailing edge and a face extending between said edges and substantially conforming to a plane, said face being adapted to guide the slice being formed as the cutting edge penetrates the article, a set of orbital strip-cutting knives each having a cutting edge and a leading face extending from such edge, the cutting edges of the orbital knives extending lengthwise of the slicing knife cutting edge and being spaced apart circumferentially within an orbital path of movement therefor of which the principal axis is parallel with said knives and rearward of said trailing edge but on the side of the projected plane of the slice guide face toward which such face faces, said path having a nadir on the opposite side of said plane rearwardly of said trailing edge and a portion of said path extending toward said face while curving rearwardly through said plane contiguously with said trailing edge to the nadir, means drivingly connected with the knives for maintaining their leading faces facing substantially in the direction of slice movement while orbitally moving such knives to carry their edges successively in said orbital path portion toward the slicing knife face to penetrate a slice being formed as it moves across the face away from the slicing knife edge and to penetrate completely through the slice attendant to such edges passing through said plane contiguously rearwardly of said trailing edge.

11. In a machine for performing intersecting cuts in product articles to sectionalize the same, a forward slicing knife edge adapted to penetrate such an article moved rearwardly transversely across said edge to remove a slice from such article, means providing a slice guiding face substantially conforming to a plane and extending rearward from said edge and adapted for sliding engagement by the slice as it is being formed while moving linearly rearward from said edge in contiguous parallelism with said face, said guiding face having a trailing edge spaced rearwardly from the slicing knife edge, a set of linear orbital strip-cutting knives each having a cutting edge and a leading face extending from such edge, the cutting edges of the orbital knives extending lengthwise of the slicing knife cutting edge and being spaced apart circumferentially within an orbital path of movement therefor of which the principal axis is parallel with said knife edges and on the side of the projected plane of the slice guiding face toward which said face faces, said path having a nadir on the opposite side of said plane rearwardly of said trailing edge and a portion of said path extending toward said face while curving rearwardly through said plane contiguously with said trailing edge to the nadir, means cooperable with said slicing knife edge and movable relatively thereto for moving said article transversely of the knife edge to form the slice and propel the same over said guiding face, and means drivingly connected with the orbitally movable knives for maintaining their leading faces facing substantially rearwardly and operable in timed relation with the article moving means for imparting orbital movement to said knives in a direction in said orbital path portion causing successive approach thereof toward the slice guiding face to penetrate the slice being formed and concurrently imparting to the face-approaching knives a component of orbital movement along said path in the direction of movement of the slice and at an accelerating speed to increase the spacing between the leading faces of the face-approaching knives in a fore and aft direction.

12. The combination set forth in claim 11 wherein the means imparting orbital movement to said knives has an operating speed in relation to that of the slice propelling means that the orbital speed component of such knives in the direction of slice movement during traverse of said orbit portion and while approaching the orbit nadir is increased to a magnitude exceeding that of the slice, substantially simultaneously with the knives penetrating through the slice.

13. The combination set forth in claim 11 wherein the means imparting orbital movement to said knives has an operating speed in relation to that of the slice propelling means that the orbital speed component of such knives in the direction of slice movement during traverse of said orbit portion and while approaching the orbit nadir accelerates to a magnitude slightly less than the slice speed at the instant of knife contact therewith and continues acceleration of such speed component at a rate that such knife commences to exceed the speed of the slice substantially simultaneously with such knife completing its cut through the slice whereby strips thus cut from a leading portion of the slice are propelled by the knives at a speed to depart rearwardly from the slice.

References Cited in the file of this patent

UNITED STATES PATENTS

| | | |
|---|---|---|
| 1,221,594 | Richman | Apr. 3, 1917 |
| 1,268,394 | Shamblen | June 4, 1918 |
| 1,322,738 | Tuck | Nov. 25, 1919 |
| 2,103,345 | Taylor | Dec. 28, 1937 |
| 2,187,252 | Urschel | Jan. 16, 1940 |
| 2,242,557 | Urschel et al. | May 20, 1941 |
| 2,349,212 | Urschel et al. | May 16, 1944 |
| 2,406,107 | Quinn | Aug. 20, 1946 |